United States Patent
Stoichita

(10) Patent No.: US 7,482,793 B2
(45) Date of Patent: Jan. 27, 2009

(54) RIPPLE GENERATION IN BUCK REGULATOR USING FIXED ON-TIME CONTROL TO ENABLE THE USE OF OUTPUT CAPACITOR HAVING ANY ESR

(75) Inventor: Ioan Stoichita, Campbell, CA (US)

(73) Assignee: Micrel, Inc., San Jose, CA (US)

( * ) Notice: Subject to any disclaimer, the term of this patent is extended or adjusted under 35 U.S.C. 154(b) by 234 days.

(21) Appl. No.: 11/530,548

(22) Filed: Sep. 11, 2006

(65) Prior Publication Data

US 2008/0061750 A1 Mar. 13, 2008

(51) Int. Cl.
*G05F 1/56* (2006.01)
(52) U.S. Cl. .................. 323/282; 323/271; 323/283
(58) Field of Classification Search ............. 323/271, 323/282, 283
See application file for complete search history.

(56) References Cited

U.S. PATENT DOCUMENTS

| | | | |
|---|---|---|---|
| 6,147,478 | A | 11/2000 | Skelton et al. |
| 6,583,610 | B2 | 6/2003 | Groom et al. |
| 7,202,642 | B1 * | 4/2007 | Chen et al. .............. 323/222 |
| 2007/0222423 | A1 * | 9/2007 | Chen et al. .............. 323/283 |
| 2008/0030181 | A1 * | 2/2008 | Liu et al. ................. 323/283 |
| 2008/0061750 | A1 * | 3/2008 | Stoichita ................. 323/271 |
| 2008/0088284 | A1 * | 4/2008 | Weng ..................... 323/271 |
| 2008/0088292 | A1 * | 4/2008 | Stoichita et al. ......... 323/285 |

OTHER PUBLICATIONS

"LM3100 Simple Switcher® Synchronous 1MHz 1.5A Step-Down Voltage Regulator," National Semiconductor data sheet, Feb. 2006, pp. 1-15.
"LM5007 High Voltage (80V) Step Down Switching Regulator," National Semiconductor data sheet, Dec. 2004, pp. 1-12.
Rais Miftakhutdinov, "Synchronous buck regulator design using the TI TPS5211 high-frequency hysteretic controller," Texas Instruments Incorporated, Analog and Mixed-Signal Products, Nov. 1999, pp. 10-14.
"TPS5211 High Frequency Programmable Hysteretic Regulator Controller," Texas Instruments data sheet, Sep. 1999, downloaded from www.datasheetcatalog.com, pp. 1-31.

(Continued)

*Primary Examiner*—Jeffrey L Sterrett
(74) *Attorney, Agent, or Firm*—Patent Law Group LLP; Carmen C. Cook

(57) ABSTRACT

A buck switching regulator formed on an integrated circuit and receives an input voltage and provides a switching output voltage on a switch output node using a fixed on-time, minimum off-time feedback control scheme. The buck switching regulator includes a first capacitor and a first resistor formed on the integrated circuit where the first capacitor and the first resistor are connected in series between the switch output node and a feedback voltage node, and a second capacitor coupled between the DC output voltage node and the feedback voltage node. The first capacitor and the first resistor generate a ripple voltage signal being related to the switching output voltage and provide the ripple voltage signal to the feedback voltage node for use in the fixed on-time, minimum off-time feedback control scheme where the magnitude of the ripple voltage signal is a function of the capacitance value of the second capacitor.

17 Claims, 3 Drawing Sheets

OTHER PUBLICATIONS

"SC470 Synchronous Buck Controller for Dynamic Load-Voltage Applications," Semtech data sheet, Sep. 27, 2005, www.semtech.com, pp. 1-31.

MAX1710/MAX1711/MAX1712 Data Sheet, "High-Speed, Digitally Adjusted Step-Down Controllers for Notebook CPUs," Maxim Integrated Products data sheet, 2000, pp. 1-28.

"Analysis and Design of a Hysteretic Constant Frequency Buck Regulator Using the LM5007," National Semiconductor Corporation Application Note 1319, May 2004, pp. 1-18.

* cited by examiner

RIPPLE GENERATION IN BUCK REGULATOR USING FIXED ON-TIME CONTROL TO ENABLE THE USE OF OUTPUT CAPACITOR HAVING ANY ESR

FIELD OF THE INVENTION

The invention relates to switching regulators or DC-to-DC converters and, in particular, to a control scheme incorporated in a buck regulator using fixed on-time control to enable the buck regulator to be coupled to an output capacitor having any value of ESR.

DESCRIPTION OF THE RELATED ART

DC voltage regulators or switching regulators operate to convert energy from one DC voltage level to another DC voltage level. This type of switching regulators is also referred to as DC/DC converters. A switching regulator, sometimes referred to as a switching mode power supply, provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

A switching regulator can be configured to step up the input voltage or step down the input voltage or both. Specifically, a buck switching regulator, also called a "buck converter," steps down the input voltage while a boost switching regulator, also called a "boost converter," steps up the input voltage. A buck-boost switching regulator, or buck-boost converter, provides both step-up and step-down functions.

The operation of the switching regulator is well known and is generalized as follows. A power switch is turned on to apply energy to an inductor of the output filter circuit to allow the current through the inductor to build up. When the power switch is turned off, the voltage across the inductor reverses and charges are transferred onto an output capacitor of the output filter circuit and the load. A relatively constant output voltage is maintained by the output capacitor. A second power switch is sometimes used for synchronous control operation.

A switching regulator can be constructed using integrated (internal) power switches or external power switches. When the power switches are external to the switching regulator integrated circuit (IC), the switching regulator IC is sometimes referred to as a "switching regulator controller" or a converter controller to indicate that the switching regulator controller provide the control signals for driving the external power switches which are in turn coupled to the output filter circuit to generate the relatively constant output voltage. A switching regulator controller is also referred to as a buck controller, a boost controller, or a buck-boost controller depending on the voltage conversion function of the controller.

Buck switching regulators or "buck regulators" with fixed on-time control are preferred in the industry for some important advantages as good efficiency for light load in PFM (pulse width modulation) mode, easy synchronization with external signals, easy control of a relatively large off-time and a very small fixed on-time to regulate a high input voltage to a low output voltage.

Fixed on-time (or constant on-time) regulators are one type of voltage regulators employing ripple-mode control while hysteretic regulators is another type of switching regulators also employing ripple-mode control. In general, ripple-mode regulators regulate their output voltage based on the ripple component in the output signal. Because of the switching action at the power switches, all switch-mode regulators generate an output ripple current through the switched output inductor. This current ripple manifests itself as an output voltage ripple due, principally, to the equivalent series resistance (ESR) in the output capacitors placed in parallel with the load.

A hysteretic regulator uses a comparator to compare the output voltage being regulated, including ripple, to a hysteresis control band. Above an upper hysteresis limit, the hysteretic controller switches its associated output inductor low, and below a lower hysteresis limit the hysteretic controller switches the output inductor high. On the other hand, a fixed on-time regulator, while operating similar to hysteretic controllers, switches the output inductor high for a fixed time when the output ripple falls below a single reference point. At the end of the fixed on-time, if the output ripple is still below the single reference point, the output inductor is switched low for a minimum off-time before getting switched back high for the fixed on-time again.

For voltage regulators using ripple-mode control, while the output ripple is useful in output voltage regulation, it is undesirable in terms of output signal noise and load voltage limits. Indeed, the desire to minimize output ripple has lead to design and production of capacitors having very low ESR. Lowering output capacitor ESR can significantly lower the output ripple signal. Low ripple serves the interests of noise minimization and reduced load voltage variation, but makes ripple-mode regulation more difficult. Low ripple magnitude reduces the comparator voltage differentials, making accurate and fast comparison very difficult.

To that end, manufacturers of fixed on-time voltage regulators impose a minimum ESR for the output capacitor to ensure a minimum amount of ripple voltage at the output voltage so that effective ripple-mode control can be realized. Thus, an output capacitor with a large ESR has to be used with all fixed on-time voltage regulators. In some cases, when the output capacitor itself does not have enough ESR, manufacturers suggest including a resistor in series with the output capacitor to introduce enough series resistance to generate the required minimum amount of ripple voltage.

One solution to the requirement of a high ESR output capacitor is adding a current feedback in the control loop. In another case, a virtual ripple generator is used to generate an internal virtual ripple proportional with inductor current. While these solutions allow for the use of low ESR capacitor in ripple-mode voltage regulators, these solutions add complexity and cost to the voltage regulators.

The requirement of a minimum amount of ripple voltage at the output signals limits the application of fixed on-time voltage regulators to cases where ripples in the output voltage can be tolerated. Also, zero ESR capacitors, such as ceramic capacitors, which are usually cheaper than tantalum capacitors having large ESR, cannot be used because a minimum amount of ESR is required for proper control loop operation.

SUMMARY OF THE INVENTION

According to one embodiment of the present invention, a buck switching regulator is formed on an integrated circuit and receives an input voltage where the buck switching regulator controls a first switch and a second switch using a fixed on-time, minimum off-time feedback control scheme to drive a switch output node for generating a switching output voltage. The switch output node is coupled to an LC filter circuit external to the integrated circuit to generate a regulated output voltage having a substantially constant magnitude on an output node. The regulated output voltage is fed back to the buck switching regulator to a voltage divider for generating a feedback voltage on a feedback voltage node. The buck switching regulator includes a first capacitor and a first resistor formed on the integrated circuit of the buck switching regulator where the first capacitor and the first resistor are connected in series between the switch output node and the feedback voltage node, and a second capacitor coupled between the output node and the feedback voltage node.

In operation, the first capacitor and the first resistor generate a ripple voltage signal being related to the switching output voltage and provide the ripple voltage signal to the feedback voltage node for use in the fixed on-time, minimum off-time feedback control scheme where the magnitude of the ripple voltage signal is a function of the capacitance value of the second capacitor.

A method in buck switching regulator receiving an input voltage and controlling a first switch and a second switch using a fixed on-time, minimum off-time feedback control scheme to drive a switch output node for generating a switching output voltage, where the switch output node is coupled to an LC filter circuit to generate a regulated output voltage having a substantially constant magnitude on an output node and the regulated output voltage is fed back to the buck switching regulator to a voltage divider for generating a feedback voltage on a feedback voltage node, includes generating a ripple voltage signal from the switching output voltage, injecting the ripple voltage signal to the feedback voltage node for use in the fixed on-time, minimum off-time feedback control scheme, and adjusting the magnitude of the ripple voltage signal at the feedback voltage node using a capacitive divider.

The present invention is better understood upon consideration of the detailed description below and the accompanying drawings.

DETAILED DESCRIPTION OF THE PREFERRED EMBODIMENTS

In accordance with the principles of the present invention, a buck switching regulator using a fixed on-time and minimum off-time control loop incorporates a ripple injection circuit for internally generating the necessary ripple using the switching output voltage and injecting the ripple voltage signal into the feedback control loop of the voltage regulator. The amount of ripple to be generated is adjusted by a feedforward capacitor which can be integrated onto the buck regulator or be externally coupled to the buck regulator. In this manner, the buck regulator can be configured to work with an output capacitor having any equivalent series resistors (ESR) values. In particular, when the output capacitor coupled to the buck regulator has a large ESR, the feedforward capacitor is used to program the ripple injection circuit to generate little or no ripple from the switching output voltage. However, when the output capacitor coupled to the buck regulator has zero or very little ESR, the feedforward capacitor is used to program the ripple injection circuit to generate the necessary ripple from the switching output voltage.

The buck switching regulator incorporating a ripple injection circuit provides many advantages over the conventional solutions. First, the buck switching regulator of the present invention enables the use of output capacitors having any ESR values. Thus, it is possible to use an output capacitor of zero or low ESR values, such as ceramic capacitors, to obtain an output voltage with very low output ripple. Meanwhile, the ripple injection circuit generates the necessary ripple internally using the switching output voltage so that the generated ripple voltage does not impact the output voltage whatsoever.

According to one aspect of the present invention, the ripple injection circuit includes a first capacitor and a first resistor connected in series between the switching output voltage and the feedback voltage and also includes a feedforward capacitor connected between the output voltage and the feedback voltage. In one embodiment, the first capacitor and the first resistor are integrated together with the resistor dividers of the feedback voltage onto the same integrated circuit of the buck switching regulator while the feedforward capacitor is formed external to the switching regulator integrated circuit. In another embodiment, the feedforward capacitor is also integrated on the switching regulator integrated circuit. When integrated on-chip, the feedforward capacitor can be formed as a capacitor with programmable capacitance so that the desired capacitance is selected to adjust the desired amount of ripple that is to be generated.

Figure 1:
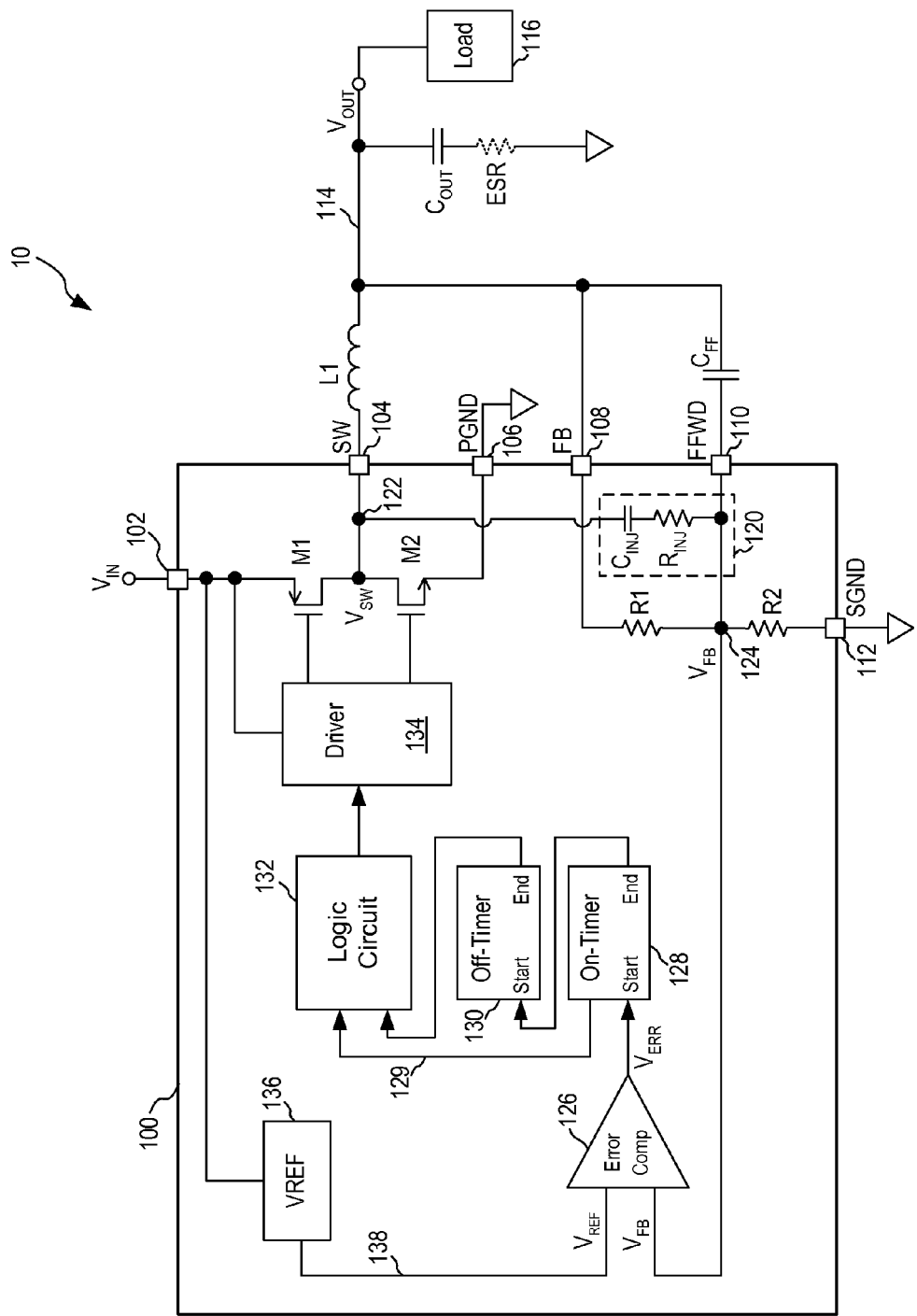
FIG. 1 is a schematic diagram of a fixed on-time voltage regulator incorporating the ripple injection control scheme according to one embodiment of the present invention.

FIG. 1 is a schematic diagram of a fixed on-time, minimum off-time buck switching regulator incorporating the ripple injection circuit according to one embodiment of the present invention. Referring to FIG. 1, a buck switching regulator system 10 includes a buck switching regulator 100 ("buck regulator 100") coupled to an output LC filter circuit. Buck regulator 100 receives an input voltage $V_{IN}$ and provides a switching output voltage $V_{SW}$ (terminal 104) to the output LC filter circuit formed by an inductor L1 and an output capacitor $C_{OUT}$. The output LC filter circuit generates a DC output voltage $V_{OUT}$ at an output voltage node 114 having substantially constant magnitude. In actual implementation, the output voltage $V_{OUT}$ is coupled to drive a load 116, as shown in FIG. 1. The output capacitor $C_{OUT}$ has associated with it a certain amount of ESR, as represented by the dotted-line resistor ESR connected in series with the output capacitor. When an output capacitor with zero ESR is used, resistor ESR has zero resistance and is therefore a short circuit.

Buck regulator 100 implements a fixed on-time, minimum off-time feedback control loop. In the present description, fixed on-time is also referred to as "constant on-time". In the following description, the fixed on-time feedback control loop of buck regulator 100 will be described first, followed by the description of the ripple injection circuit for injecting the desired amount of ripple to the feedback control loop.

Referring to FIG. 1, buck regulator 100 receives an input voltage $V_{IN}$ on a terminal 102. A pair of power switches M1 and M2 is connected in series between the input voltage $V_{IN}$ (terminal 102) and a ground voltage at a PGND terminal 106. In the present configuration, buck regulator 100 includes separate ground connections, PGND and SGND, for the power switches and the rest of the circuitry for noise isolation purposes. The use of separate ground connections for noise isolation is well known in the art and is not critical to the practice of the present invention. In the present embodiment, power switch M1 is a PMOS transistor and power switch M2 is an NMOS transistor and are controlled by drive signals generated by a driver 134. A switching output voltage $V_{SW}$ is generated at the common node 122 between power switches M1 and M2. The switching output voltage $V_{SW}$ is coupled through a SW terminal 104 to an inductor-capacitor (LC) filter network including inductor L1 and output capacitor $C_{OUT}$ for filtering the switching output voltage $V_{SW}$ and generating the DC output voltage $V_{OUT}$ at the output voltage node 114 having a substantially constant magnitude. In actual implementation, the DC output voltage $V_{OUT}$ is used to drive load 116.

The DC output voltage $V_{OUT}$ is coupled back to buck regulator 100 to form a feedback control loop for regulating the switching output voltage $V_{SW}$. Specifically, output voltage $V_{OUT}$ is coupled through a FB terminal 108 to a voltage divider formed by resistors R1 and R2. A feedback voltage $V_{FB}$ (node 124), being a stepped down version of the output voltage $V_{OUT}$, is coupled to a first input terminal (the negative input terminal) of an error comparator 126. A reference voltage $V_{REF}$ (node 138) is coupled to a second input terminal (the positive input terminal) of error comparator 126. Reference voltage $V_{REF}$ is generated by a voltage reference circuit 136 powered by the input voltage $V_{IN}$. The voltage reference circuit 136 is well known and many circuit configurations are possible for receiving the input voltage $V_{IN}$ and generating a reference voltage $V_{REF}$ having the desired voltage magnitude.

Error comparator 126 evaluates the difference between the feedback voltage $V_{FB}$ and the reference voltage $V_{REF}$ and provides an error voltage signal $V_{ERR}$ indicative of the difference between the feedback voltage $V_{FB}$ and the reference voltage $V_{REF}$. To form the fixed on-time control loop, the error voltage signal $V_{ERR}$ is coupled to the Start input terminal of an On-Timer 128. On-Timer 128 provides a predetermined on-time duration when the Start signal is asserted and provides an End output signal indicating the end of the predetermined on-time duration. When the feedback voltage $V_{FB}$ falls below the reference voltage $V_{REF}$, the error voltage signal $V_{ERR}$ is asserted and the on-time duration programmed in On-Timer 128 is initiated. When the on-time duration is initiated, On-Timer 128 also provides a control signal on a bus 129 to a logic circuit 132 to instruct logic circuit 132 to turn on the high-side switch M1. The current through inductor L1 is thus allowed to build up. High-side switch M1 is turned on only for a fixed duration. When the on-time duration expires, On-Timer 128 instructs logic circuit 132 to turn off the high-side switch M1 and turn on low-side transistor M2.

To implement the minimum off-time control, the End output signal from On-Timer 128 is coupled to the Start input terminal of an Off-Timer 130. Thus, when the on-time duration expires, the off-time duration programmed in Off-Timer 130 is initiated. Off-Timer 130 provides an End output signal to logic circuit 132 to indicate the end of the off-time duration, at which time the power transistor M1 can be turned back on if the feedback voltage $V_{FB}$ is less than the reference voltage $V_{REF}$. In this manner, a minimum off-time is implemented in the feedback control loop.

Through the operation of error comparator 126, On-timer 128, and Off-Timer 130, logic circuit 132 generates control signals to driver 134 to cause power switches M1 and M2 to be turned on and off alternately to generate the switching output voltage $V_{SW}$. In the present embodiment, the feedback control loop is established so that the on-time of buck switching regulator 100 is adaptable to different input voltages and different output voltages with the goal to keep the operating frequency constant.

Figure 2:
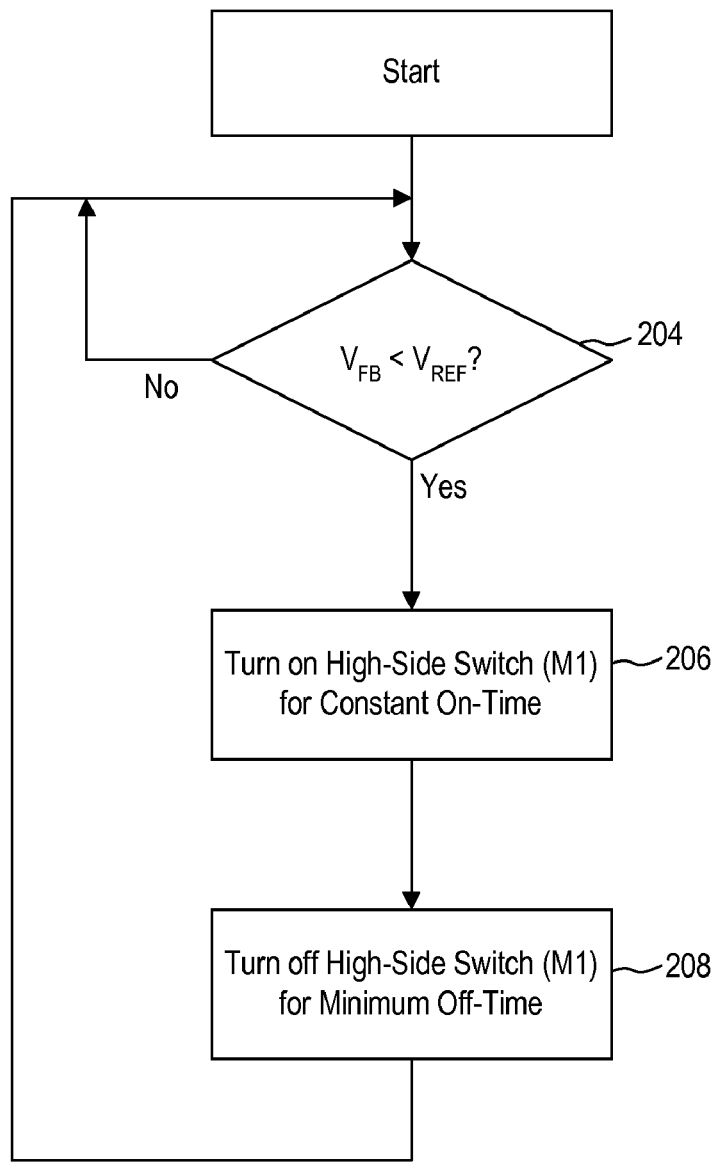
FIG. 2 illustrates the constant on-time and minimum off-time control loop employed by the voltage regulator of FIG. 1.
Figure 3:
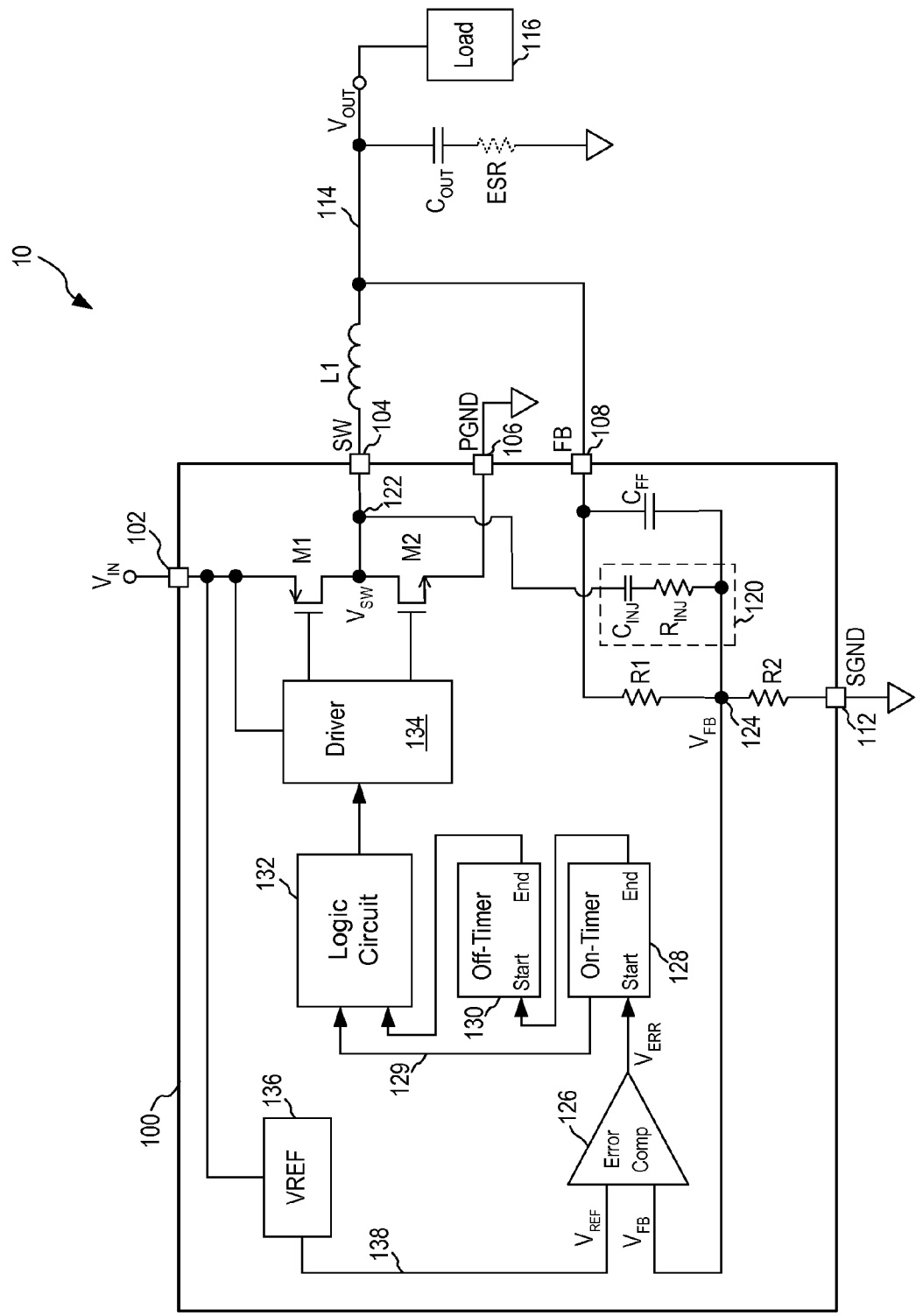
FIG. 3 is a schematic diagram of a fixed on-time voltage regulator incorporating the ripple injection control scheme according to a second embodiment of the present invention.

FIG. 2 is a flow chart illustrating the constant on-time and minimum off-time feedback control loop operation implemented in buck switching regulator system 10 of FIG. 1.

Referring to FIG. 2, at the start of the feedback control loop, the feedback voltage $V_{FB}$ is compared against the reference voltage $V_{REF}$ (step 204). If the feedback voltage $V_{FB}$ is less than the reference voltage $V_{REF}$, then the control loop turns on the high-side switch M1 (and turns off the low-side switch M2) for a fixed amount of on-time (step 206). Following the fixed on-time, the high-side switch M1 is turned off (and the low-side switch M2 turned on) for a minimum amount of off-time (step 208). The control loop then returns to the comparison step 204. If the feedback voltage $V_{FB}$ is greater than or equal to the reference voltage $V_{REF}$, then no action is taken and the high-side switch M1 remains turned off while the low-side switch M2 remains turned on. However, if the feedback voltage $V_{FB}$ is still less than the reference voltage $V_{REF}$, the high-side switch M1 is turned on again for a fixed on-time (step 206). The control loop continuously operates to keep the feedback voltage $V_{FB}$ at or above the reference voltage $V_{REF}$.

As illustrated by the flow chart of FIG. 2, the buck regulator system 10 of FIG. 1 will adjust the off-time by increasing the off-time from a minimum off-time (min-toff) to a nominal off-time when the feedback voltage $V_{FB}$ is equal to or greater than the reference voltage $V_{REF}$. In the case of continuous current mode, the operating frequency of the buck regulator will be stable and the duty cycle is given as:

$$D = \frac{Vout}{Vin} = \frac{ConstTon}{ConstTon + Contr.Toff} \qquad \text{Eq. (1)}$$

where ConstTon is the constant on-time and Contr.Toff is the off-time. If the constant on-time is defined as:

$$ConstTon \sim \frac{1}{Vin} \qquad \text{Eq. (2)}$$

The frequency of switching output voltage is then constant as a function of $V_{IN}$. Constant frequency of the switching output voltage is desirable in some applications.

Returning to FIG. 1, buck switching regulator 100 includes a ripple injection circuit 120 working in conjunction with a feedforward capacitor $C_{FF}$ for generating a given amount of ripple from the switching output voltage and injecting the ripple voltage signal into the feedback control loop of the buck switching regulator system 10. By including the ripple injection circuit and the feedforward capacitor $C_{FF}$, buck regulator 100 of the present invention can be coupled to an output capacitor $C_{OUT}$ having any value of ESR. That is, a zero-ESR capacitor, such as a ceramic capacitor, can be used as the output capacitor $C_{OUT}$ so that the ripple voltage at the output voltage $V_{OUT}$ is minimized. Meanwhile, the ripple injection circuit and the feedforward capacitor of the present invention operate to provide the necessary ripple for the feedback control loop. On the other hand, if a capacitor with a large ESR is used, the ripple injection circuit of the present invention can be deactivated by the feedforward capacitor as no ripple generation is necessary.

Ripple injection circuit 120 includes a first capacitor $C_{INJ}$ and a resistor $R_{INJ}$ connected in series between the switching output voltage $V_{SW}$ (node 122) and the feedback voltage $V_{FB}$ (node 124). The ripple injection circuit 120 works in conjunction with the voltage divider of resistors R1 and R2 to generate the feedback voltage $V_{FB}$ having the desired voltage level and the desired amount of ripple. In accordance with the present invention, the ripple injection circuit 120 is coupled to the switching output voltage node 122 so that the ripple voltage signal is generated from the switching output voltage $V_{SW}$. In other words, the ripple voltage signal is a divided-down signal of the switching output voltage $V_{SW}$ and is at the switching frequency of the switching output voltage. The amount of ripple signal generated at the feedback voltage $V_{FB}$ node 124, if any, is determined by the capacitance value of the feedforward capacitor $C_{FF}$. Feedforward capacitor $C_{FF}$ is connected between the output voltage $V_{OUT}$ (node 114) and a feedforward FFWD terminal 110 of buck regulator 100. The feedforward FFWD terminal 110 is connected directly to the feedback voltage $V_{FB}$ node 124. Thus, feedforward capacitor $C_{FF}$ is connected between the output voltage $V_{OUT}$ and the feedback voltage $V_{FB}$.

The ripple voltage signal generated by the ripple injection circuit 120 is the ratio of the equivalent resistance of the resistor divider R1/R2 to resistor $R_{INJ}$. The ripple voltage is also divided by capacitor $C_{INJ}$ and the feedforward capacitor $C_{FF}$. When the switching output voltage $V_{SW}$ is applied to capacitor $C_{INJ}$, capacitor $C_{INJ}$ acts as a differentiator. If the switching output voltage $V_{SW}$ switches sufficiently rapidly, then capacitor $C_{INJ}$ acts as a short circuit. The voltage at the feedback voltage node 124 is thus given as: (R1//R2)/(R1//R2)+$R_{INJ}$). In this manner, the switching output voltage $V_{SW}$ is divided down to generate the ripple voltage signal. In one embodiment, the ripple voltage has a peak-to-peak magnitude of approximately 20 mV.

Feedforward capacitor $C_{FF}$ is coupled in parallel with resistors R1 and R2 and acts as a capacitive divider with capacitor $C_{INJ}$. Thus, the peak-to-peak voltage of the ripple voltage signal is made a function of the capacitance value of the feedforward capacitor $C_{FF}$. Accordingly, the capacitance value of feedforward capacitor $C_{FF}$ is used to program the ripple injection circuit to allow buck regulator 100 to work with output capacitor $C_{OUT}$ having any ESR values.

More specifically, feedforward capacitor $C_{FF}$ is AC coupled between the output voltage $V_{OUT}$ and the feedback voltage $V_{FB}$. If the capacitance of capacitor $C_{FF}$ is very large, then capacitor $C_{FF}$ is a short circuit to the AC signals that may appear at the output voltage $V_{OUT}$ node 114. As such, the ripple injection circuit is shorted out by the large feedforward capacitor $C_{FF}$ and no ripple signal generated by the ripple injection circuit is injected to the feedback voltage $V_{FB}$ node. Instead, the output voltage $V_{OUT}$, with the ripple voltage component, is coupled to the voltage divider of the feedback control loop through FB terminal 108. The feedback voltage $V_{FB}$ is thus generated from an output voltage signal $V_{OUT}$ having the necessary ripple.

On the other hand, if the capacitance of capacitor $C_{FF}$ is very small or is zero, then capacitor $C_{FF}$ is an open circuit to the AC signals that may appear on the output voltage $V_{OUT}$ node 114. In this case, the ripple signal generated by the ripple injection circuit of capacitor $C_{inj}$ and $R_{inj}$ passes to the feedback voltage $V_{FB}$ node 124 and the maximum amount of ripple is provided to the feedback control loop.

Thus, in actual implementation, when an output capacitor $C_{OUT}$ with sufficiently large ESR is used, there is no need for ripple injection circuit 120 to generate any ripple voltage signal for the feedback control loop. When no ripple voltage signal from the ripple injection circuit is desired, a feedforward capacitor $C_{FF}$ having a large capacitance value is used where the large feedforward capacitor $C_{FF}$ essentially shorts out the effect of capacitor $C_{INJ}$ of the ripple injection circuit and the ripple signal generated by the ripple injection circuit is canceled out by the feedforward capacitor $C_{FF}$.

On the other hand, when an output capacitor $C_{OUT}$ with a small or zero ESR is used, the ripple injection circuit 120 is relied upon to provide the necessary ripple voltage signal for the feedback control loop. Thus, a feedforward capacitor $C_{FF}$ having a small capacitance value is used to allow the ripple signal generated by the ripple injection circuit 120 from the switching output voltage $V_{SW}$ to be passed to the feedback voltage node 124.

The feedforward capacitor $C_{FF}$ thus operates to adjust the amount of ripple voltage that is to be provided by the ripple injection circuit 120. In one embodiment, the feedforward capacitor $C_{FF}$ has a capacitance value in the range of 220 pF to 2.2 nF. The buck regulator 100 can thus work with output capacitor having any ESR value simply by selecting the corresponding capacitance value for the feedforward capacitor. The feedforward capacitor, besides being used as a capacitive divider with the ripple injection circuit, also serves to improve the stability of the transient response by providing a zero to the feedback control loop.

Furthermore, because the ripple voltage signal generated by the ripple injection circuit is an AC version of the switching output voltage $V_{sw}$ coupled to drive the inductor L1, the ripple voltage signal is directly proportional to the input voltage Vin. From control loop stability standpoint, it is good to have a big ripple but from accuracy (load regulation, output voltage ripple) standpoint, the ripple should be minimized to have a minimum impact when input voltage is varying.

In the present embodiment, the feedforward capacitor $C_{FF}$ is formed external to the integrated circuit of the buck regulator 100 to allow different capacitance values of the feedfoward capacitor to be used to coordinate with the ESR characteristics of the output capacitor $C_{OUT}$. The amount of injected ripple voltage can thus be fine-tuned by the feedforward capacitance $C_{FF}$. However, in other embodiments, the ripple injection circuit and the feedfoward capacitor $C_{FF}$ can both be integrated onto the buck regulator integrated circuit to reduce the number of external components in the buck switching regulator system 10. When integrated, the feedforward capacitor $C_{FF}$ can have a capacitance value suitable for a given range of ESR values of the output capacitor.

The buck regulator incorporating the ripple injection circuit and the feedforward capacitor of the present invention realizes many advantages over the conventional solutions. For instance, one prior art solution generates the ripple voltage from the output voltage $V_{OUT}$ by amplifying the remaining small amount of ripple voltage. When the ripple signal is indeed very small, it is very difficult to replicate the ripple and very difficult to differentiate the ripple signal from noise signals. To the contrary, the ripple injection circuit of the present invention generates the ripple signal from the switching output voltage. Thus, simple circuitry can be used to divide-down the switching output voltage and the ripple signal can be generated free of noise.

The above detailed descriptions are provided to illustrate specific embodiments of the present invention and are not intended to be limiting. Numerous modifications and variations within the scope of the present invention are possible. The present invention is defined by the appended claims.

I claim:

1. A buck switching regulator formed on an integrated circuit and receiving an input voltage, the buck switching regulator controlling a first switch and a second switch using a fixed on-time, minimum off-time feedback control scheme to drive a switch output node for generating a switching output voltage, the switch output node being coupled to an LC filter circuit external to the integrated circuit to generate a regulated output voltage having a substantially constant magnitude on an output node, the regulated output voltage being fed back to the buck switching regulator to a voltage divider for generating a feedback voltage on a feedback voltage node, the buck switching regulator comprising:

a first capacitor and a first resistor formed on the integrated circuit of the buck switching regulator, the first capacitor and the first resistor being connected in series between the switch output node and the feedback voltage node; and a second capacitor coupled between the output node and the feedback voltage node, wherein the first capacitor and the first resistor generate a ripple voltage signal being related to the switching output voltage and provide the ripple voltage signal to the feedback voltage node for use in the fixed on-time, minimum off-time feedback control scheme, the magnitude of the ripple voltage signal being a function of the capacitance value of the second capacitor.

2. The buck switching regulator of claim 1, wherein the second capacitor is formed external to the integrated circuit of the buck switching regulator.

3. The buck switching regulator of claim 1, wherein the second capacitor is formed on the integrated circuit of the buck switching regulator.

4. The buck switching regulator of claim 2, wherein the LC filter circuit includes a first inductor and an output capacitor and the second capacitor has a capacitance value related to the equivalent series resistance (ESR) value of the output capacitor.

5. The buck switching regulator of claim 4, wherein the second capacitor has a large capacitance value when the output capacitor has a large ESR value and the second capacitor has a small capacitance value when the output capacitor has a small or has a zero ESR value.

6. The buck switching regulator of claim 5, wherein the second capacitor has a large capacitance value of about 2.2 nF and a small capacitance value of about 220 pF.

7. The buck switching regulator of claim 5, wherein the ripple voltage signal has a small magnitude when the second capacitor has a large capacitance value and the ripple voltage signal has a large magnitude when the second capacitor has a small capacitance value.

8. The buck switching regulator of claim 3, wherein the LC filter circuit includes a first inductor and an output capacitor and the second capacitor has a capacitance value related to a range of equivalent series resistance (ESR) values of the output capacitor.

9. The buck switching regulator of claim 1, wherein the ripple voltage signal is a divided down voltage of the switching output voltage.

10. A method in buck switching regulator receiving an input voltage and controlling a first switch and a second switch using a fixed on-time, minimum off-time feedback control scheme to drive a switch output node for generating a switching output voltage, the switch output node being coupled to an LC filter circuit to generate a regulated output voltage having a substantially constant magnitude on an output node, the regulated output voltage being fed back to the buck switching regulator to a voltage divider for generating a feedback voltage on a feedback voltage node, the method comprising:

generating a ripple voltage signal from the switching output voltage;

injecting the ripple voltage signal to the feedback voltage node for use in the fixed on-time, minimum off-time feedback control scheme; and adjusting the magnitude of the ripple voltage signal at the feedback voltage node using a capacitive divider.

11. The method of claim 10, further comprising:

providing a first capacitor and a first resistor connected in series between the switch output node and the feedback voltage node, the first capacitor and the first resistor generating the ripple voltage signal from the switching output voltage and injecting the ripple voltage signal to the feedback voltage node.

12. The method of claim 11, wherein the ripple voltage signal is a divided down voltage of the switching output voltage.

13. The method of claim 11, wherein adjusting the magnitude of the ripple voltage signal at the feedback voltage node using a capacitive divider comprises:

providing a second capacitor between the output voltage node and the feedback voltage node, the magnitude of the ripple voltage signal being a function of the capacitance value of the second capacitor.

14. The method of claim 13, wherein the LC filter circuit includes a first inductor and an output capacitor and the second capacitor has a capacitance value related to the equivalent series resistance (ESR) value of the output capacitor.

15. The method of claim 14, wherein providing a second capacitor comprises providing a second capacitor having a large capacitance value when the output capacitor has a large ESR value and providing a second capacitor having a small capacitance value when the output capacitor has a small or has a zero ESR value.

16. The method of claim 15, wherein the second capacitor has a large capacitance value of about 2.2 nF and a small capacitance value of about 220 pF.

17. The method of claim 13, wherein the ripple voltage signal has a small magnitude when the second capacitor has a large capacitance value and the ripple voltage signal has a large magnitude when the second capacitor has a small capacitance value.

* * * * *